Figure 1:
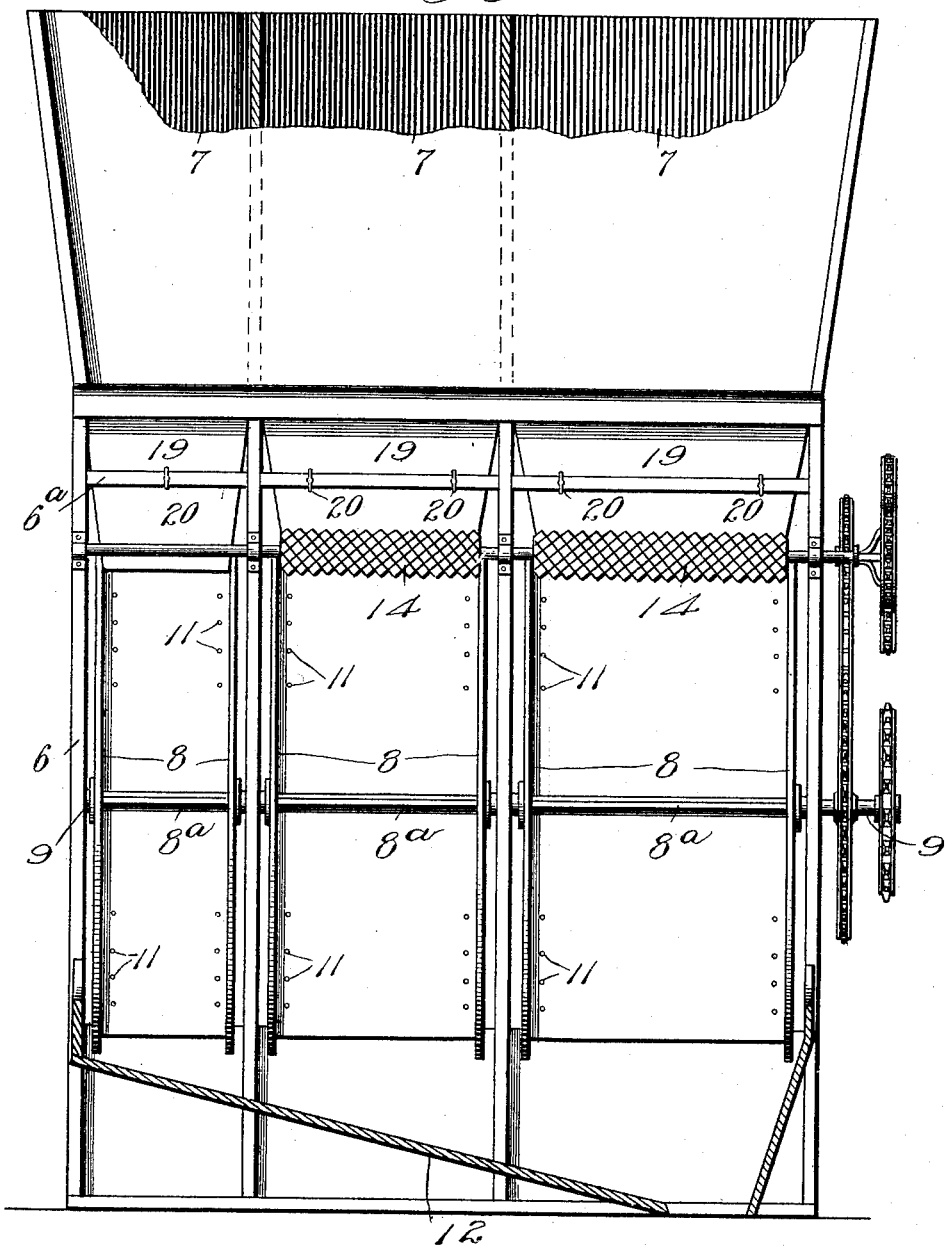

No. 718,905. PATENTED JAN. 20, 1903.
W. H. BROWN.
MIXING AND MEASURING MACHINE FOR CONCRETE.
APPLICATION FILED MAY 7, 1902.
NO MODEL. 2 SHEETS—SHEET 1.

No. 718,905. PATENTED JAN. 20, 1903.
W. H. BROWN.
MIXING AND MEASURING MACHINE FOR CONCRETE.
APPLICATION FILED MAY 7, 1902.
NO MODEL. 2 SHEETS—SHEET 2.
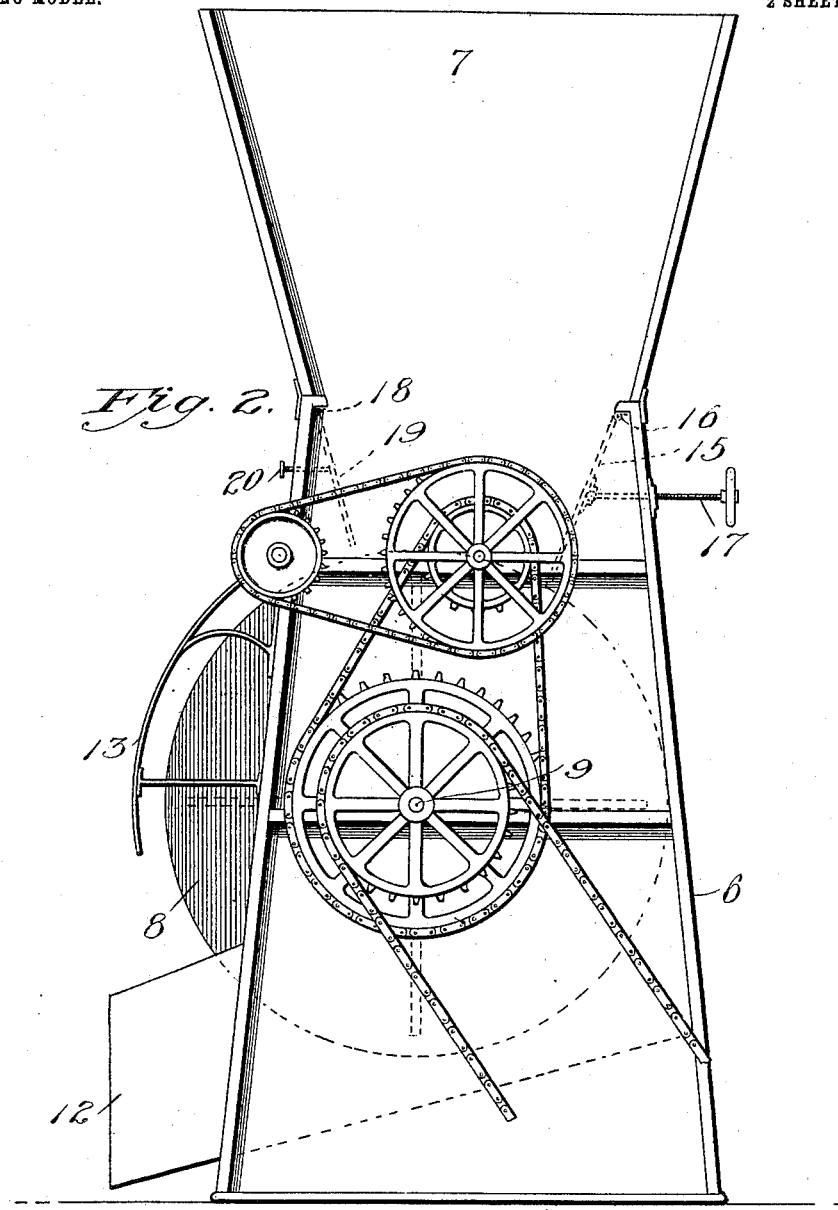
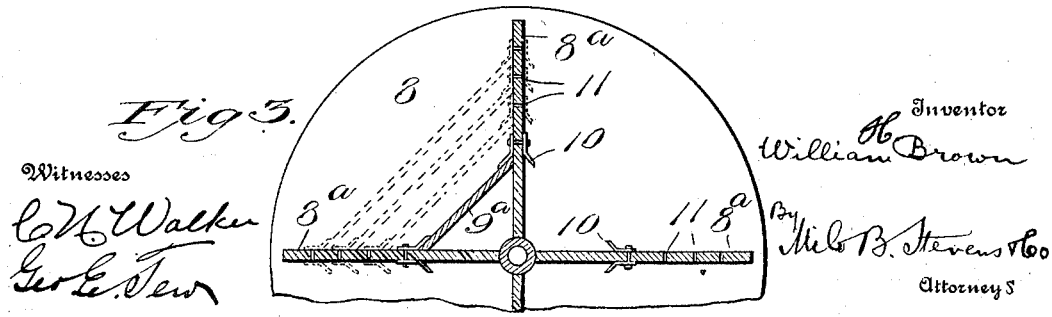

UNITED STATES PATENT OFFICE.

WILLIAM H. BROWN, OF ELYRIA, OHIO, ASSIGNOR OF ONE-HALF TO WILLIAM GALLUP, OF MEDINA, OHIO.

MIXING AND MEASURING MACHINE FOR CONCRETE.

SPECIFICATION forming part of Letters Patent No. 718,905, dated January 20, 1903.

Application filed May 7, 1902. Serial No. 106,267. (No model.)

*To all whom it may concern:*

Be it known that I, WILLIAM H. BROWN, a citizen of the United States, residing at Elyria, in the county of Lorain and State of Ohio, have invented certain new and useful Improvements in Mixing and Measuring Machines for Concrete; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to mixing and measuring machines for concrete.

The object of the invention is to form a machine which will save time and labor in measuring and mixing the different constituents of concrete.

Generally speaking, the machine comprises separate hoppers for cement, sand, and stone or other ingredients and below the hoppers corresponding measuring and dumping wheels to take the material from the hoppers and to discharge the same into a trough. Means are provided to adjust the discharge capacity of the wheels according to the proportions desired.

In the accompanying drawings, Figure 1 is a front elevation of the machine. Fig. 2 is an end elevation thereof. Fig. 3 is a sectional detail of one of the wheels, showing the manner of changing the capacity thereof.

Referring specifically to the drawings, 6 indicates the frame of the machine, at the top of which is supported a series of hoppers 7, adapted to respectively contain the several ingredients of the mixture. Below each hopper measuring and dumping wheels 8 are mounted to revolve on a shaft 9, journaled in bearings on the frame of the machine. Each of these wheels is divided by cross-partitions $8^a$ into a number of pockets to receive the material which drops from the hopper. The pockets have bottoms 9, which are retained by removable flanged irons 10, bolted to the partitions. Said partitions have a series of holes 11, at any of which the irons may be bolted, and corresponding bottoms being used the depth and capacity of the pockets may be varied as desired.

An inclined chute or trough is indicated at 12, into which the pockets empty.

13 indicates an apron in front of the wheels to prevent the material from falling out beyond the chute.

The revolving toothed cylinders or wheels 14 are levelers, revolving in a direction opposite to the sprocket-wheels 8 and serve to level off the sand and stone in the pockets. These levelers are illustrated as applied only to the sand and stone wheels, the cement-wheel being sufficiently leveled by the lower edge of the hopper. The effect of the levelers 14 is to force back into the hopper any stone or sand in excess of that sufficient to fill the pockets of the wheels.

The lower part of the back of the hoppers (indicated at 15) is hinged, as at 16, and is operated by screw and hand wheel 17, forming a gate to regulate the flow of material. The lower part of the front of the hopper is also hinged, as at 18, forming a door 19, which may be raised to permit access to the interior. Stops for the door are formed by buttons 20, which project through a cross-bar $6^a$ on the frame of the machine.

The rotating parts may be driven by any suitable gear.

It will be seen that by varying the capacity of the pockets the ingredients of the mixture can be gaged to suit different requirements. As the material from the several wheels falls down the chute it becomes mixed and ready for the water.

What I claim is—

1. In a machine of the class described, in combination, a series of hoppers, wheels having pockets of adjustable capacity below the hoppers, adapted to receive material therefrom, rotating levelers over the pockets adjacent the mouth of the hoppers, and a mixing-chute below the wheels to receive the material falling therefrom.

2. In a machine of the class described, in combination, hoppers having hinged gates at the bottom thereof to vary the flow of material therefrom, wheels below the hoppers having measuring-pockets receiving the material from the hoppers, means to adjust the size of the pockets, cylindrical levelers over the pockets, by the mouth of the hoppers, rotating in a direction opposite to the wheels, and a discharge-chute adjacent the wheels.

3. In a machine of the class described, the combination with hoppers and corresponding wheels thereunder having pockets to receive material from the hoppers, of toothed leveling-cylinders revolving over the pockets adjacent the mouth of the hoppers.

4. In a machine of the class described, in combination, the hoppers 7, the wheels 8 having measuring-pockets, the rotary levelers 14, the aprons 13, and the chute 12.

In testimony whereof I affix my signature in presence of two witnesses.

WILLIAM H. BROWN.

Witnesses:
　WILLIAM GALLOP,
　JOHN A. BOMMHARDT.